United States Patent [19]

Torterotot

[11] Patent Number: 4,735,335
[45] Date of Patent: Apr. 5, 1988

[54] COMPOSITE BAND FOR LIDS FOR THERMOPLASTIC CONTAINERS

[75] Inventor: Roland Torterotot, Longvilliers, France

[73] Assignee: Etude et Realisation de Chaines Automatiques-E.R.C.A., France

[21] Appl. No.: 47,402

[22] Filed: May 6, 1987

[51] Int. Cl.⁴ .............................................. B65D 17/34
[52] U.S. Cl. ..................... 220/270; 220/260; 220/359
[58] Field of Search ............... 220/260, 270, 276, 359; 229/43 R; 156/244.11, 244.18; 428/195; 215/347, 348, 349

[56] References Cited

U.S. PATENT DOCUMENTS

| | | | |
|---|---|---|---|
| 4,280,653 | 7/1981 | Elias | 220/359 |
| 4,452,842 | 6/1984 | Borges et al. | 428/195 |
| 4,556,152 | 12/1985 | Bogren | 220/276 |
| 4,562,936 | 1/1986 | Deflander | 220/260 |
| 4,636,273 | 1/1987 | Wolfersperger | 156/244.11 |
| 4,693,390 | 9/1987 | Hekal | 220/359 |

FOREIGN PATENT DOCUMENTS 2503036  4/1981  France .
2551031  3/1985  France .

Primary Examiner—George T. Hall
Attorney, Agent, or Firm—Scully, Scott, Murphy & Presser

[57] ABSTRACT

The invention relates to a band with lids for flat-edged thermoplastic containers comprising a first band in aluminum and a second thermoplastic band adhering via a thermo-adhesive film in such a way as to make the first removable by peeling; the second band comprises a slit.

According to the present invention, the faces defining the slit are perpendicular to the second band and at a very small distance one from the other, the thermo-adhesive film has areas with two different adhesive powers, the area with the higher adhering power being located within the zone defined by the slit whereas the other area is located outside said zone, and a sealing or tightening film covers the whole underface of the second band.

7 Claims, 2 Drawing Sheets

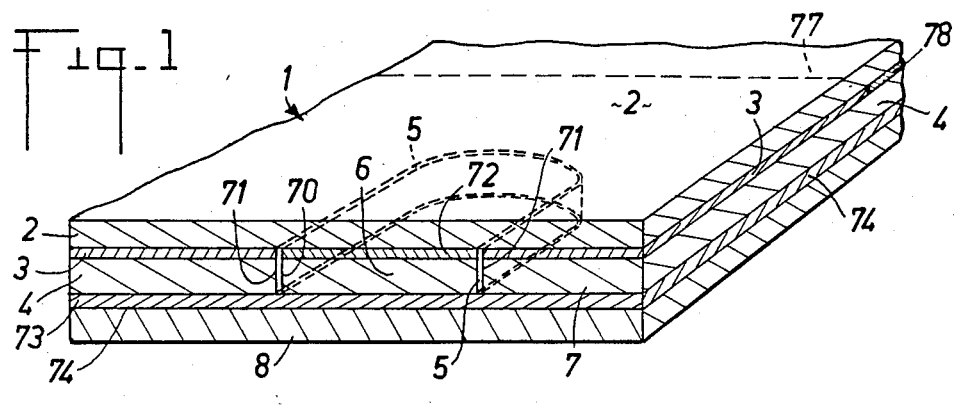

COMPOSITE BAND FOR LIDS FOR THERMOPLASTIC CONTAINERS

BACKGROUND OF THE INVENTION

The present invention relates to a composite band for lids for thermoplastic containers having a flat and preferably horizontal upper edge or rim, said composite band being of the type comprising downward from the top: a first thin band in aluminum or equivalent material, a thermo-adhesive film bonded to the lower face of the first band, and a second band in thermoplastic material adhering to the first band via said thermo-adhesive film and adapted to be separated therefrom by peeling off, said second band having, in each part corresponding to the position of each lid to be subsequently cut out, at least one slit of curved configuration defining a passage and the ends of which are either located closely or coinciding.

DESCRIPTION OF THE PRIOR ART

This type of composite band is already known from French Pat. No. 81 06 557 (Publication No. 2 503 036).

Given the fact that the first upper band may be removed by being peeled off, the second band, which is normally thermobonded in tight manner on the upper edge of the container, and that the slit traverses perpendicularly the second band up to the first band, tightness failures may occur along the separating interface between the first and second bands, thus giving bacteria uncontrolled access into the container by allowing them to follow the said interface as far as the slit.

According to another solution proposed in French Pat. No. 83 13639 (Publication No. 2 551 031), a passage opening is made in the second band in an area where a lid is provided, said opening being covered over on one side by the first band bonded in peelable manner to the upper face of the second band except where said opening is provided, and on the other side, by a thermoplastic sealing off strip which is firmly i.e. non-removably bonded on the one hand, to the lower face of the second band and, on the other hand, where the opening into which it penetrates, is situated on the lower face of the first band.

Although said thermoplastic strip is capable of conferring to the lid the required tightness before the peeling off of the first band, since it is tightly sealed to the edge of the container and adheres firmly to the lower face of the second band, it nevertheless comprises other disadvantages as regards the production of the composite band and the uncovering of the passage opening.

During the manufacture of the composite band, and in particular during the step consisting in making the passage openings in the second band, the stamped-in parts of the second band are difficult to remove and delay the positioning of the first band and of the thermoplastic strip. Moreover, said latter must be sufficiently supple in order to penetrate into said passage opening and to adhere firmly to the lower face of the first band. It is generally found that the film or strip does not adhere to the first band in the area of the edge of the passage opening.

When the passage opening is uncovered, namely when the first band is peeled off from the second bonded band, via the thermoplastic film on the edge of the container, said film is stretched through the passage opening by the first band to which it is bonded, and should tear off along the edge which is constituted by the edge of the opening made in the second band. It has been found that the film tears off uneasily and irregularly, so that the passage opening, once uncovered, does not present a neat and clean-cut outline.

It is the object of the present invention to overcome these disadvantages by proposing a composite band of the aforementioned type which enables the consumer to have a neat and clean-cut opening and which can be manufactured in a simplified manner.

OBJECT AND SUMMARY OF THE INVENTION

This object is reached according to the invention with a composite band of the aforementioned type due to the fact that:

the slit is defined on both sides by faces which are very close together and perpendicular to the lower face of the second band, the first band is bonded to the second band via two thermo-adhesive films with different adhesive powers, the film with high adhesive power being provided inside the area defined by the slit and the film with low adhesive power being provided outside that area, and a thermoplastic tightening or sealing film adheres strongly to the entire lower face of the second band, inside as well as outside the area defined by said slit.

According to these particular features, there is no possiblity for the thermoplastic film to stretch and said film is cut cleanly in the spot where the edge formed by the lower face of the second band and the vertical external face of the slit is situated, said vertical external face constituting the edge of the uncovered passage opening, when the first band has been peeled off. Another advantage of this concept resides in the fact that the part of the second band situated inside the area defined by the slit is only removed at the moment when the passage opening is uncovered and remains attached to the first band.

BRIEF DESCRIPTION OF THE DRAWINGS

The invention will be more readily understood on reading the following description with reference to the accompanying drawings, in which:

FIG. 1 is a diagrammatical perspective view of a length of a composite band with lids, equipped on its lower face with a band for containers or with a protection band, FIG. 2 is a plan view of a container with a lid according to the invention, FIG. 3 is an elevational view of a cross-section along line III of FIG. 2 showing a container with a lid according to the invention, FIG. 4 is a view similar to that shown in FIG. 3, but with the lid having its passage opening uncovered.

DESCRIPTION OF A PREFERRED EMBODIMENT

Figure 5:
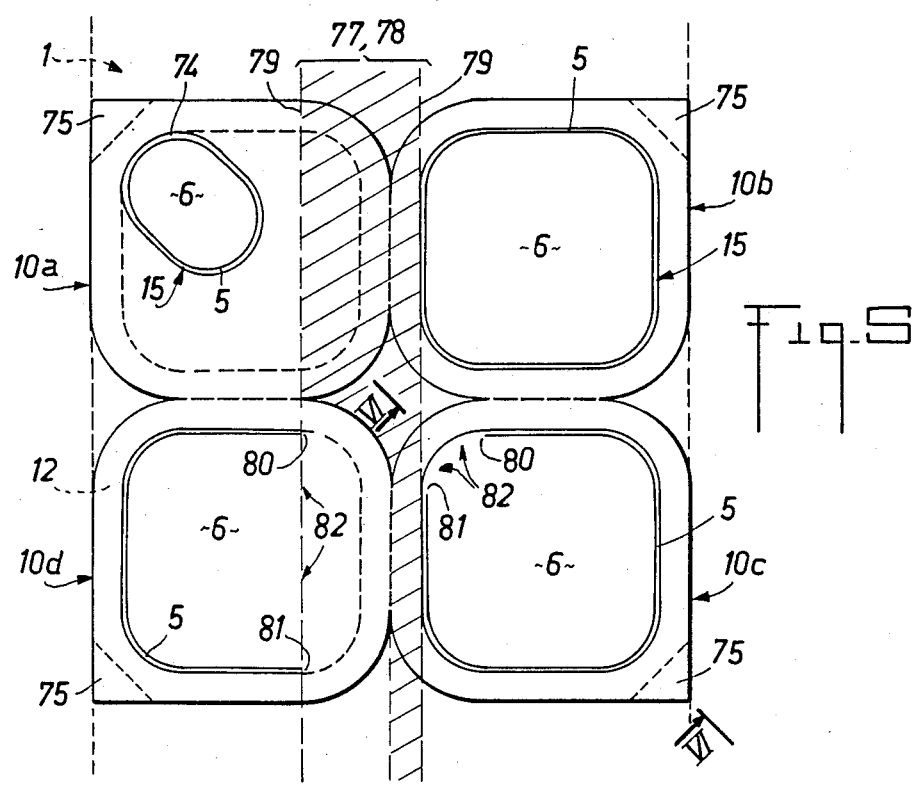
FIG. 5 is a diagrammatical plan view of the composite band for lids, showing different configurations and dispositions of the passage opening, the thermoplastic film being permanently heat-bonded on the edges of the set of containers.

Referring now to the drawings, FIG. 1 shows that the composite lid band 1 comprises, downward from the top layer, a first band or sheet 2 of aluminum or equivalent material which is provided with a thermo-adhesive film 3, and a second band made of thermoplastic material 4. Said thermo-adhesive film 3 or other type of adhesive layer exerts a relatively low adhesive force on the two bands 2 and 4 so that these can be peeled off one from the other. In those areas of the composite band corresponding to lids to be subsequently cut, or, to be precise, in those lid parts situated above the openings of the containers, the second band 4 comprises, for each lid, slit 5 obtained preferably by localized melting or punching of the thermoplastic material of the band 4 after the bonding thereof with band 2. Said slits 5 are defined by faces 70, 71 perpendicular to the contacting faces of the band 4, they follow a closed or nearly closed curve or loop and extend from the lower face to the upper face of the second band 4, and they can even be cut through the thermo-adhesive film and reach to the lower face of the aluminum band 2. The distance between the two parallel faces 70, 71 of slit 5 is very small so that even a thin layer of thermoplastic material cannot penetrate therein, for example, when said thermoplastic material is in a molten state.

Part 6 of the second band 4, which part 6 is situated inside the zone defined by a slit 5, adheres very strongly to the first band 2 by means of a layer of adhesive having a high adhesive power 72 and part 7 of said band 4, which part 7 is situated outside the area of part 6 defined i.e. surrounded by the slit 5, is bonded to the first band 2, at least along a zone close to said slit 5, in a tight but removable manner, thanks to the thermo-adhesive film 3. Thus, the bonding achieved between bands 2 and 4, outside the area surrounded or defined by slit 5, is of such a strength as to allow peeling of aluminum band 2 from thermoplastic band 4, whereas within said area delimited by slit 5, part 6 of the band 4 remains firmly bonded to the aluminum band 2 due to the action of the film or layer of adhesive 72 with high adhering power.

The entire lower face of the second band 4 is firmly bonded, either directly or through a layer of adhesive with high adhering power 73, to a thermoplastic film 74, and this, in both parts 6 and 7 of band 4, i.e. within as well as outside the area defined by the outer face 71 of the slit 5, said area thereafter becoming an access or passage opening 15. The thermoplastic film 74 is designed to cover, in a tight manner, the slit 5 and to be permanently and tightly bonded to the edge of the containers 9.

As described in French Pat. No. 81 06557 (Publication No. 2 551 031), the composite lid band 1 may be equipped with a third band 8 which is either a protective band, or at the same time a band called a container band, since it is from that band 8, which in this case will need to be in thermoplastic material, that the thermoplastic containers 9 will be formed by thermo-form, after separation of the lid band 1, which containers 9 once filled with a product, will be sealed off by means of said lid band 1.

FIGS. 2 to 4 illustrate a plan view and cross-sectional views of a container 9 complete with a lid 10 produced from the composite band 1. Said lid 10, of the same structure as composite band 1, comprises, inside the opening zone 11 of the container 9, the slit 5, and is heat-sealed on the flat edge rim 12 of said container 9, so that the thermoplastic film 74 of the lid 10 adheres permanently and tightly to the material constituting the edge 12. The operation consisting of heat-sealing the lid 10 is performed in the conventional way. In order to facilitate the start of the aluminum band or sheet 2 peeling off operation for uncovering the access or passage opening 15, a zone tip (tiny area) 76 free of any thermo-adhesive film 3, is provided on the lower face of said aluminum band 2, corresponding to a gripping corner 75 of the edge 12 of container 9, this permitting easy gripping of aluminum sheet 2 and peeling off thereof at least until the access opening 15, defined in the second band 4 by slit 5, is uncovered. Given that part 6 of band 4, which part 6 is encircled or defined by slit 5, is very strongly bonded both to the aluminum sheet and to the thermoplastic sealing film 74, which in its turn is thermo-sealed to the edge 12 of the container 9, the part of film situated inside the area defined by outer face 71 of slit 5 is torn along the edge formed at the intersection of said outer face 71 with the lower face of second band 4 and is removed with part 6 of said second band 4, when said aluminum sheet 2 is peeled off from second band 4.

To prevent aluminum sheet or band 2 from being completely separated from the thermoplastic band 4 of lid 10, another strong and non-peelable bonding is advantageously provided between aluminum sheet 2 and band 4, within a zone 77 of composite band 1 and a fixed distance from the passage opening 15, hence from the slit 5, or else in the immediate vicinity of the latter, although always in a marginal zone of the lid. Said other bonding can also be produced with a layer of adhesive of high adhering power 78 spread for example in the form of a thin strip over band 4 astride two series or rows of juxtaposed lids or containers (see FIGS. 2 to 5).

FIG. 5 illustrates various embodiments or configurations of the slits 5, hence of the passage openings 15, as well as of the permanent bonding area of the aluminium sheet on the thermoplastic band. For the sake of comprehension, it is assumed in this FIG. 5 that the aluminum sheet 2 and the sheet of adhesive of low adhering power 3 have been removed and that zones or areas 72 and 78 reserved for the layers of adhesive with high adhering power between aluminum sheet 2 and band 5 only schematically indicated. Moreover, the composite lid band 1 is represented therein in the form of cut lids permanently fixed on the edge or rim of the corresponding containers 9.

On the lid 10a, it is noted that the slit 5 made in the band 4 forms a closed loop, and is placed, with respect to the container opening 11, so that its outline partly joins up with the outline of said container opening 11, and thereafter extends diagonally towards the center of said container opening. Part 6 of the band 4, situated within the zone or area defined, or surrounded by the slit 5, is provided at its upper part with a layer of adhesive with strong adhering poewr, as is the case with zone 77, 78. The slit 5 is, understandably, sealed off by the thermoplastic film 74 bonded tightly to the edge 12 of the container and ahering strongly to the lower face of band 4.

It is easy to understand that the action of peeling off aluminum sheet 2 starting from the gripping corner or tip 75, uncovers access opening 15 by tearing off sealing film 74 along the aforementioned edge which coincides with the outline of access opening 15. The operation of peeling off aluminum sheet 2 is stopped as soon as the edge or border line 79 of the strong bonding zone 77, 78 is reached.

Lid 10b comprises a slit 5 of which the outline coincides with the outline of the container opening 11. In this case, sealing film 74 will be torn off, during the peeling off operation, in the immediate vicinity of the vertical wall of the container, thereby giving a maximum opening. The peeling off operation is stopped as soon as the edge or border line 79 of the strong bonding zone 77, 78 between bands 2 and 4 is reached, said edge 79 coinciding in this case with one side of the slit 5.

Figure 6:
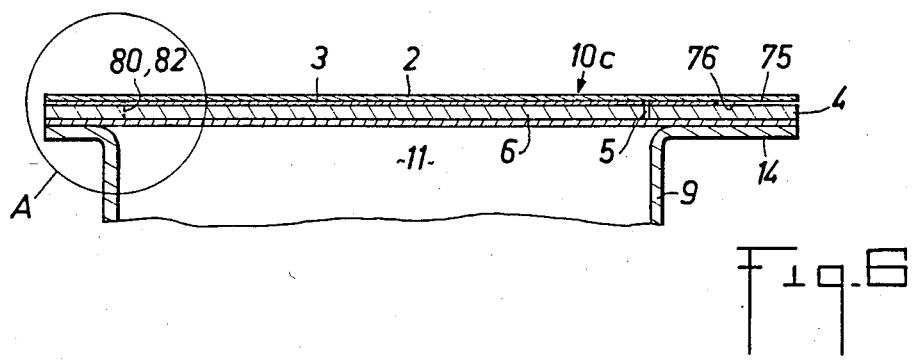
FIG. 6 shows a vertical section of one of the containers of FIG. 5, taken along line VI—VI of said Figure.
Figure 7:
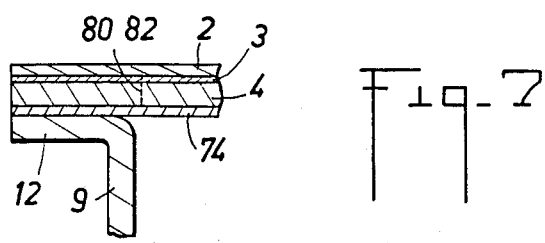
FIG. 7 is a view of a detail A from FIG. 6.

In order to keep the partly peeled off aluminum band or sheet 2 attached to the container—i.e. once the access or passage opening 15 is uncovered, without having to use an extra layer of adhesive with high adhering power, as in the case of lids 10a and 10b, sealing film 74 and thermoplastic band 4 will be advantageously used (see FIGS. 5 to 7). To this effect, a slit 5 is made with non-jointed ends 80, 81, namely with spaced apart ends leaving between them a folding zone 82 which makes it possible to uncover the access opening 15 while being kept fixed to the container 9 and holding together the assembly composed to the torn part of film 74, of part 6 of band 4 and of aluminum sheet 2.

The slit 5 made in lid 10c is not closed up so as to form a closed loop in the zone 82 situated opposite the gripping tip 75 and which will subsequently correspond to the folding zone of said lid. This design is particularly advantageous wherein slit 5 is situated near the side wall of the container 9 and thus corresponds nearly to the edge of opening 11 of container 9.

Lid 10d has a slit 5 of which the outline coincides with part of the outline of opening 11, the end 80, 81 of which define a folding zone 82 which is substantially rectilinear and parallel to one of the sides of the container edge 12. The position or location of this folding zone 82 is so selected that at least half, and preferably more than half of the opening of the container 11 can be uncovered when the aluminum sheet is peeled off.

Obviously, the band or sheet can also be constituted of a sheet of paper or of a band of polyester. Band 4 may be of PVC or polyester. The sealing film 74 may be of polyethylene and band 8 may be of polypropylene or may even be a composite band.

What is claimed is:

1. Composite band with lids for thermoplastic containers having a flat and preferably horizontal upper edge or rim, said composite band being of the type comprising downward from the top: a first thin band in aluminum or equivalent material, a thermo-adhesive film bonded to the lower face of the first band, and a second band in thermoplastic material adhering to the first band via said thermo-adhesive film and adapted to be separated therefrom by peeling off, said second band having, in each part corresponding to the position of each lid to be subsequently cut out, at least one slit of curved configuration defining a passage and the ends of which are either located closely together or coincide, wherein
    - the slit is defined on both sides by faces which are very close together and perpendicular to the lower face of the second band,
    - the first band is bonded to the second band via two thermo-adhesive films with different adhesive powers, the film with high adhesive power being provided inside the area defined by the slit, and the film with low adhesive power being provided outside that area, and
    - a thermoplastic tightening or sealing film adheres strongly to the entire lower face of the second band, inside as well as outside the area defined by said slit.

2. Composite band as claimed in claim 1, wherein a third band adheres in removable manner to the lower face of the tightening or sealing film.

3. Composite band as claimed in claim 1, wherein the lower face of the first band is provided with a tiny adhesive free area which corresponds to a gripping corner of the container edge.

4. Composite band as claimed in claim 1, wherein said band comprises, outside the slit in a marginal zone of the lid, a strong and non-removable bond between the first and second bands.

5. Composite band as claimed in claim 1, wherein the outline of the slit coincides at least partly with that of the container opening.

6. Composite band as claimed in claim 1, wherein the two ends of the slit leave therebetween a folding zone which is substantially rectilinear and is situated in such a place that at least one-half the opening of the container can be uncovered when the first band is peeled off.

7. Composite band as claimed in claim 6, wherein the folding zone is parallel to one of the sides of the edge of the container.

* * * * *